United States Patent [19]

Jones et al.

[11] Patent Number: 4,694,462

[45] Date of Patent: Sep. 15, 1987

[54] LASER WITH BYPASS GAS DEFLECTOR

[75] Inventors: Ronald E. Jones, Cupertino, Calif.; Royal D. Peterson, Alpharetta, Ga.

[73] Assignee: Continental Laser Corporation, Mountain View, Calif.

[21] Appl. No.: 808,863

[22] Filed: Dec. 13, 1985

[51] Int. Cl.⁴ ............................................. H01S 3/03
[52] U.S. Cl. ......................................... 372/61; 372/58
[58] Field of Search ....................... 372/61, 65, 35, 34, 372/58, 59

[56] References Cited

U.S. PATENT DOCUMENTS

| | | | |
|---|---|---|---|
| 3,988,698 | 10/1976 | Crane et al. | 372/87 |
| 4,378,600 | 3/1983 | Hobert | 372/62 |
| 4,385,390 | 5/1983 | McMahen | 372/63 |
| 4,434,493 | 2/1984 | Chaffee | 372/86 |

OTHER PUBLICATIONS

Coherent, "INNOVA Ion Laser Systems," 1984.

Primary Examiner—Eugene R. LaRoche
Assistant Examiner—Seung Ham

[57] ABSTRACT

A laser having a deflector in which bypass gas is separated from a cathode and the local discharge region around the cathode, and in which the bypass gas has a relatively long open passage around the deflector to the cathode. The deflector has an open end surrounding at least a portion of the cathode and an aperture and having an aperture and a raised shoulder connected to the end of a laser tube. The aperture is aligned with the discharge bore of the laser tube with gas bypass bores outside of the aperture enclosed by the shoulder. The anode end of the laser tube may also have a deflector which is an annular washer having an aperture and a raised shoulder. The washer has a diameter nearly as large as the anode in which it is mounted.

15 Claims, 4 Drawing Figures

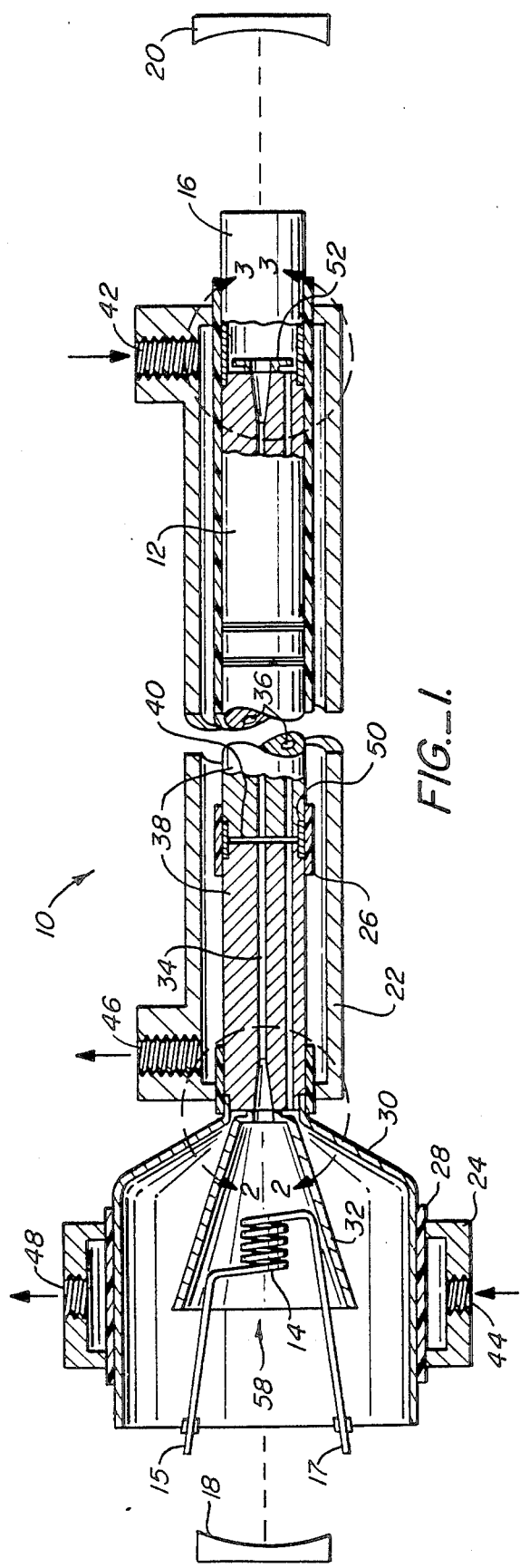
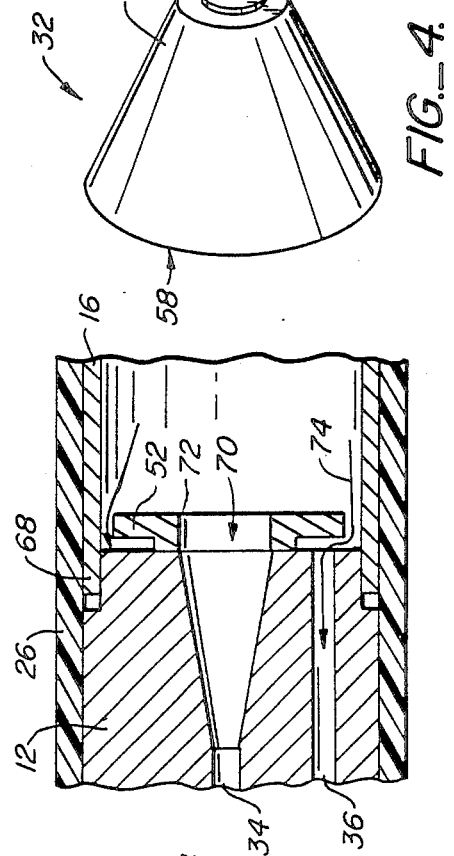
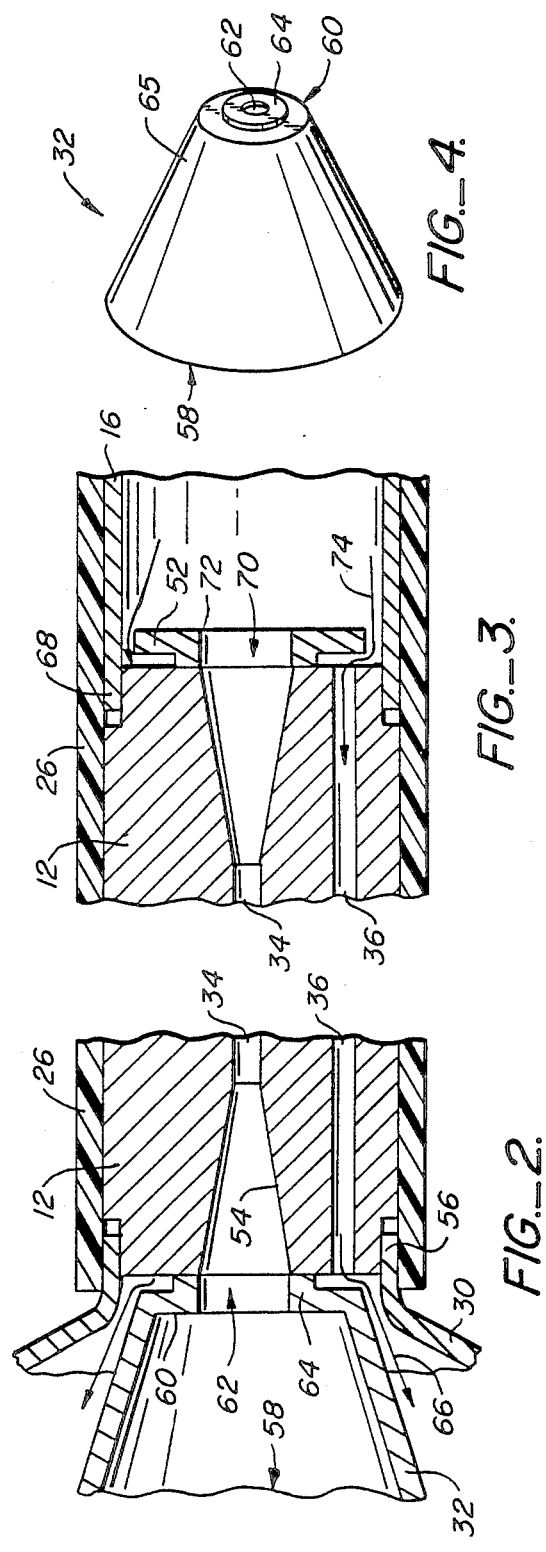

LASER WITH BYPASS GAS DEFLECTOR

TECHNICAL FIELD

The present invention relates to gas ion lasers having a discharge tube with a separate gas return path or bypass, and in particular to ion lasers with means for preventing discharge of the bypass gas.

BACKGROUND ART

One of the problems relating to gas ion lasers has been to provide a gas return path to prevent pressure buildup at one end of a laser tube due to dischargecaused gas pumping. This problem has been addressed by the prior art.

In U.S. Pat. No. 4,385,390, McMahan teaches a ceramic baffle disk having a central aperture, one side of the disc being metallized and formed with a concentric channel and communicating radial channels. The metallized side is bonded to an end of a laser tube with the central aperture at the main bore and the channels at bypass gas bores. The disc reduces the tendency of bypass gas to ignite without reducing the flow passage of the gas.

In U.S. Pat. No. 4,434,493, Chaffee shows the ceramic baffle disc mounted in combination with a cylindrical heat shield. The shield is brazed to a conventional metal end shroud by an annular brazing bead.

U.S. Pat. No. 4,378,600 to Hobart has gas return holes provided in cup-shaped members bonded to the interior wall of a laser tube. A discharge cross section is determined by apertures in discs which are coaxially affixed to or formed in the cup members. Cylindrical shields, also affixed to the cup members, control gas pumping within the tube, minimize migration of ions outside of the discharge region and maintain gas outside the discharge region at relatively low temperature. The gas return holes in the cup members are smaller than the bore diameter defined by the apertures in the discs, and may also be variably positioned so that the discharge does not pass through the bypass holes.

A major problem caused by introducing bypass gas bores and gas return holes is the tendency for the bypass gas to discharge, thereby eliminating the pressure equalizing benefit of such return paths and robbing power from the main discharge region. This problem becomes more difficult to prevent as a laser gets older. The prior art is somewhat successful in dealing with the unwanted discharge, but additional improvement is needed to produce lasers with long life.

It is an object of the present invention to produce a laser having means for preventing discharge of the bypass gas, yet which does not inhibit the flow of the bypass gas and which is characterized by a long lifetime.

DISCLOSURE OF THE INVENTION

The above object has been met with a gas ion laser having a bypass gas deflector in which the bypass gas is separated and shielded from a cathode and the local discharge region around the cathode by the deflector, and in which the bypass gas has a relatively long open passage around the deflector back to the discharge region. The deflector typically has the shape of the frustrum of a cone and has an open end and an aperture end. The open end surrounds at least a portion of the cathode and has a larger diameter than the aperture end, thereby shielding bypass gas, returning via at least one gas bypass bore in a laser tube, from the cathode. One end of the deflector has an aperture. The aperture is aligned with a discharge bore in the laser tube and may have a smaller diameter than the aperture end of the deflector itself. The deflector connects to an end of the laser tube at the aperture end, with the gas bypass bores in the laser tube outside of the deflector. The aperture end may have a raised shoulder that connects the deflector to the laser tube, with the gas bypass bores outside of the shoulder enclosing the aperture.

The bypass gas deflector and the cathode are enclosed within a gas reservoir joined in sealing relation to an end of the laser tube. The other end of the tube has an anode, which together with the cathode sustains a gas discharge in the discharge bore. The anode end of the laser tube may also have a second bypass gas deflector which is a washer having a diameter nearly as large as an anode connected to the laser tube, and having an aperture with a raised shoulder. The entire assembly of gas reservoir and laser tube with cathode, anode, and deflectors are sealed with the tube containing a gas capable of lasing action. A resonant optical cavity aligned with the tube completes the laser. The bypass gas deflector of the present invention effectively prevents unwanted discharge of gas in a gas return path.

BRIEF DESCRIPTION OF THE DRAWINGS

FIG. 1 is a side sectional view of a laser with a bypass gas deflector in accord with the present invention.

FIG. 2 is an enlargement of the region encompassed by the circle 2—2 in FIG. 1.

FIG. 3 is an enlargement of the region encompassed by the circle 3—3 in FIG. 1.

FIG. 4 is a perspective view of a bypass gas deflector for use in the laser in FIG. 1.

BEST MODE FOR CARRYING OUT THE INVENTION

With reference to FIG. 1, a gas ion laser 10 comprises a laser tube 12, a cathode 14 and an anode 16 at opposite ends of tube 12, mirrors 18 and 20 aligned with tube 12 to form a resonant optical cavity therebetween, and a liquid cooling assembly of jackets 22 and 24 and sleeves 26 and 28 for cooling the tube. A gas reservoir 30 is mounted in sealing relation to an end of tube 12. Cathode 14 is mounted within reservoir 30, along with a shield or bypass deflector 32. A gas capable of lasing action, such as argon, is contained within laser tube 12 and reservoir 30.

Laser tube 12 has a principal or longitudinal discharge bore 34 and one or more longitudinal gas bypass bores 36 therethrough. Bypass bores 36 typically have smaller diameters than discharge bore 34 in order to reduce the chance of discharges occurring in bypass bores 36. The number of bypass bores 36 may vary, with three or four bypass bores being typical. Laser tube 12 is formed of a plurality of electrically insulating cylindrical segments 38 joined together at respective segment interfaces 40. Segments 38 are typically composed of ceramic materials such as beryllia, alumina, and silica. Beryllia (BeO) is preferred because of its greater resistance to thermal shock and ion bombardment. To ensure durable operation, the segment interfaces 40 must provide good mechanical contact, and hold up to the differential thermal expansions of the metal and ceramic. Preferably, a metal braze ring 50 is used to connect the segments. Ceramic segments 38 metallized at interfaces 40 with a molybdenum-manganese alloy then brazed to the braze ring with nickel result in durable connections. Other copper-silica metals may also be used.

Cathode 14 and bypass deflector 32 are mounted inside reservoir 30. Cathode 14 preferably has the helical shape well known in the gas laser art. Cathode electrodes 15 and 17 extend outside reservoir 30 and are electrically connected to a power source, not shown.

A glow discharge is created in discharge bore 34 by exposing the gas contained by the layer tube 12 to a high r.f. field, which ionizes the gas. Heating of cathode 14 under a.c. power produces a local discharge near the cathode. The main discharge is established and maintained by a d.c. field between cathode 14 and anode 16.

Gas reservoir 30 also contains a shield or bypass deflector 32 mounted to an end of laser tube 12. The structure of the deflector 32 is described in detail below.

The discharge current in discharge bore 34 causes the gas to be pumped from the cathode to the anode end of the laser tube 12. Gas then returns via the bypass bores 36. Deflector 32 helps guide the discharge down the discharge bore 34 while inhibiting discharge of gas returning to reservoir 30 along the bypass bores 36. A deflector 52 at an anode end of laser tube 12 may further inhibit unwanted discharge by shielding bypass bores 36 from anode 16. Deflectors 32 and 52 substantially increase the electrical discharge impedance in the gas return path, but do not materially impede gas return flow.

Laser 10 has a cooling assembly of jackets 22 and 24 and sleeves 26 and 28 for loading the laser tube 12 and reservoir 30. At least one heat shrinkable, heat conducting, electrically insulating sleeve 26 fits over laser tube 12. Another heat shrinkable, heat conducting, electrically insulating sleeve 28, hereafter referred to as reservoir sleeve 28, fits over a portion of reservoir 30. Sleeves 26 cover metal rings 50 at interfaces 40 between tube segments 38. There may be one sleeve 26 for each interface 40, or alternatively, one sleeve 26 for the entire laser tube 12. When heated, sleeves 26 and 28 shrink to a tight fit that keeps water or other coolant from seeping between sleeve and tube or between sleeve and reservoir.

Coolant flows into jackets 22 and 24 at input ports 42 and 44 respectively, contacting the outer surfaces of sleeves 26 and 28 and any uncovered portions of the segments 38, then flowing out through output ports 46 and 48 respectively. Coolant is typically ordinary tap water, but may be any other liquid coolant that is used for gas laser cooling. Sleeves 26 and 28 keep the coolant away from contact with metal at interfaces 40 of laser tube 12 and metal reservoir 30. The excluded coolant is thereby prevented from corroding metal parts, while still being able to cool by direct contact with the surface to be cooled.

In FIG. 2, laser tube 12 has a discharge bore 34 with an outwardly tapered discharge end 54 and one or more gas bypass bores 36. A gas reservoir 30 is brazed to an end of laser tube 12 at a periphery 56. A coppersilica brazeable metal, such as molybenum-manganesenickel, is used to braze metal parts, such as reservoir 30, to ceramic parts. A sleeve 26 of heat shrinkable, heat conducting but electrically insulating, material fits over the laser tube 12 at the braze area of reservoir 30.

A bypass gas deflector 32 is brazed to the end of laser tube 12. Deflector 32 has an open end 58 and an aperture end 60. As shown in FIG. 1, open end 58 surrounds at least a portion and preferably all of cathode 14 as shown in FIG. 1. By "surrounding" the cathode, it is meant that at least a portion and preferably all of the electron emitting cathode surface is in the space within the deflector between the open end and the aperture end. Open end 58 is not so large nor the deflector 32 so long that deflector 32 contacts reservoir 30 or otherwise impedes the flow of the bypass gas. Aperture end 60 has an aperture 62. Deflector 32 is mounted at aperture end 60 to laser tube 12 at a position such that aperture 62 is aligned with discharge bore 34 and so that bypass bores are outside of deflector 32, i.e., outside of the aperture 62 defined in deflector 32 and between deflector 32 and reservoir 30.

Aperture end 60 may also have a raised shoulder 64 whereby deflector 32 is mounted to laser tube 12. Typically, shoulder 64 is located at the edge or rim of aperture 62. Raised shoulder 64 causes aperture end 60 to be spaced from the end of laser tube 12 and the openings to gas bypass bores 36 so that flow of bypass gas is not impeded. Shoulder 64 may be mounted to tube 12 or may form an integral part of tube 12. Alternatively, shoulder 64 may be absent with deflector 32 directly attaching to tube 12, provided bypass bores 36 are outside of the deflector and thus separated from the cathode region, and provided flow of bypass gas is not impeded.

Bypass gas 66 exiting bore 36 is deflected by deflector 32 and forced to flow on the outside of deflector 36 to reach cathode 14. Deflector 32 shields the gas flowing on the outside of the deflector from the cathode and local discharge area of ionized gas on the inside of deflector 32.

In FIG. 3, an anode 16 is brazed at a periphery 68 to the end of laser tube 12 opposite reservoir 30. Heat shrinkable, heat conducting, electrically insulating sleeve 26 fits over the laser tube at the braze area of anode 16. A second bypass gas deflector 52 is brazed to the end of the laser tube 12 in anode 16. Deflector 52 comprises an annular washer having an aperture 70 and a raised shoulder 72. Shoulder 72 is mounted to laser tube 12 so that aperture 70 is aligned with discharge bore 34 and so that bypass bores 36 are outside of shoulder 74, i.e., outside of aperture 70 enclosed by shoulder 74 and between shoulder 74 and anode 16. Alternatively, shoulder 72 may be an integral part of laser tube 12. Deflector 52 is preferably made of ceramic material, such as alumina or beryllia.

Raised shoulder 72 causes deflector 52 to be spaced from the end of laser tube 12 and the openings to gas bypass bores 36. Bypass gas 74 entering bore 36 is deflected to the outside of deflector 52 and away from discharge bore 34.

With reference to FIG. 4, deflector 32 is preferably conical in shape. Deflectors with other shapes may also be used depending on the position and number of gas bypass bores 36 and the size, shape and position of cathode 14, provided that bores 36 are adequately shielded from cathode 14 to prevent discharge without impeding gas flow. Open end 58 has a larger diameter than aperture end 60. Typically aperture 62 has a smaller diameter than the diameter of the aperture end 60 itself. Aperture end 60 is shown having a shoulder 64 which bonds to an end of a laser tube, keeping deflector 32 sufficiently spaced from the tube's bypass bores so that the flow of bypass gas around the outside of deflector 32 to the cathode region is not impeded. Shoulder 64 is not essential and usually absent when the shape of the deflector is such as to allow the deflector to be connected directly to an end of a laser tube without impeding gas flow. The length of deflector 32 is large enough to surround at least a portion of cathode 14 but not so large as to impede the flow of bypass gas around open end 58 back to the area around cathode 14. Deflector 32 is preferably made of a single integral piece of machined material such a alumina or beryllia. Alternatively, deflector 32 may be a metal, or preferably ceramic, conical piece 65 combined with a ceramic washer 64 forming the aperture end. Aperture end 60 is electrically insulating to prevent discharge, but the rest of deflector 32, while preferably electrically insulating, may be made of conductive material. Any electrically conducting parts of deflector 32 are at a floating potential and not connected to other conducting parts to prevent arcing between cathode 14 and deflector 32. In operation, an argon ion discharge is initiated between anode and cathode by the usual procedures. It has been found that the discharge is confined to the area immediately around the cathode and in the principal bore, and that no discharge occurs in the bypass bores.

Lasers produced in accord with the present invention are very strongly inhibited from discharging in the gas bypass bores by the deflectors 32 and 52. Thus, these lasers perform more reliably and have a longer life.

We claim:

1. A gas laser comprising,
   a laser tube having a longitudinal discharge bore therethrough, said tube containing a gas capable of lasing action,
   cathode and anode means at opposite ends of said tube for sustaining a gas discharge in said discharge bore,
   a resonant optical cavity aligned with said tube,
   a gas reservoir joined in sealing relation to an end of said tube, said cathode means being within said gas reservoir, said laser tube having at least one bypass bore with an opening into said gas reservoir and
   a first bypass gas deflector mounted in said reservoir and having a deflector interior region, said first deflector having an open end and an opposite aperture end, said first deflector surrounding at least a portion of said cathode means, said aperture end having an aperture, said first deflector being connected to said tube with said aperture aligned with said discharge bore, said bypass bore opening into said reservoir outside of said deflector interior region, said bypass bore being in fluid communication with said discharge bore via said open end of the first detector.

2. The gas laser of claim 1 further comprising a second bypass gas deflector mounted on an end of said laser tube in said anode means, said second deflector having an aperture with a raised shoulder, said shoulder being connected to said tube with said aperture aligned with said discharge bore, said bypass bore opening into said anode means outside of said shoulder.

3. The gas laser of claim 2 wherein said second deflector comprises a ceramic washer having an aperture with an annular raised shoulder, said ceramic washer having an outside diameter greater than the outside diameter of said annular raised shoulder, said bypass bore opening into the area between said outside diameters.

4. The gas laser of claim 1 wherein said aperture end has a raised shoulder, said shoulder connecting said deflector to said laser tube.

5. The gas laser of claim 1 wherein said open end is free standing and said first deflector surrounds all of said cathode means.

6. The gas laser of claim 1 wherein said first deflector is made of a single piece of ceramic material.

7. The gas laser of claim 1 wherein said first deflector has the shape of a frustrum of a cone, said open end being free standing having a larger diameter than said aperture end.

8. The gas laser of claim 7 wherein said first deflector comprises a conical piece combined with a ceramic washer, said washer forming said aperture end.

9. A gas laser comprising,
   a cylindrical laser tube having a longitudinal discharge bore therethrough and at least one longitudinal gas bypass bore therethrough, said tube containing a gas capable of lasing action,
   cathode and anode means at opposite ends of said tube for sustaining a gas discharge in said discharge bore,
   a resonant optical cavity aligned with said tube,
   a gas reservoir joined in sealing relation to an end of said tube, said cathode means being within said reservoir, and
   a first bypass gas deflector mounted in said reservoir, said first deflector having the shape of a frustrum of a cone, said first deflector having an open end and an opposite aperture end, said open end having a larger diameter than said aperture end, said first deflector surrounding at least a portion of said cathode means, said aperture end having an aperture, said first deflector being connected to said tube at said aperture end with said aperture aligned with said discharge bore, said bypass bore opening into said reservoir outside of said deflector, said bypass bore being in fluid communication with said discharge bore via said open end of the first detector.

10. The gas laser of claim 9 further comprising a second bypass gas deflector mounted on an end of said laser tube in said anode means, said second deflector having an aperture and a raised shoulder, said shoulder being connected to said tube with said aperture aligned with said discharge bore, said bypass bore opening into said anode means outside of said shoulder.

11. The gas laser of claim 10 wherein said second deflector comprises a ceramic washer having an aperture with an annular raised shoulder having an outer diameter less than the outer diameter of said ceramic washer, said bypass bore opening within the area between said outside diameters.

12. The gas laser of claim 9 wherein said aperture end has raised shoulder, said shoulder connecting said deflector to said laser tube.

13. The gas laser of claim 9 wherein said open end is free standing and said first deflector surrounds all of said cathode means.

14. The gas laser of claim 9 wherein said first deflector is made of a single piece of ceramic material.

15. The gas laser of claim 9 wherein said first deflector comprises a conical piece combined with a ceramic washer, said washer forming said aperture end.

* * * * *